United States Patent
Yoshida

[11] Patent Number: 5,834,742
[45] Date of Patent: Nov. 10, 1998

[54] HEATER FOR AQUARIUM FISH TANK

[75] Inventor: Nobuyuki Yoshida, Tokyo, Japan

[73] Assignee: Nihon Doubutsu Yakahin Kabushikigaisya, Tokyo, Japan

[21] Appl. No.: 595,270

[22] Filed: Feb. 1, 1996

[30] Foreign Application Priority Data

| Feb. 10, 1995 | [JP] | Japan | 7-045045 |
| Feb. 10, 1995 | [JP] | Japan | 7-045046 |
| Feb. 10, 1995 | [JP] | Japan | 7-276186 |

[51] Int. Cl.$^6$ .................................................. H05B 3/06
[52] U.S. Cl. .................... 219/523; 219/546; 219/552; 392/497; 392/498; 392/503
[58] Field of Search ..................... 392/497, 498, 392/503, 458, 444, 501; 219/523, 543, 546, 548, 552, 553

[56] References Cited

U.S. PATENT DOCUMENTS

| 3,895,217 | 7/1975 | Hall et al. ............................ 219/523 |
| 4,152,263 | 5/1979 | Goldman et al. ..................... 219/523 |
| 4,315,143 | 2/1982 | Willinger et al. .................... 219/523 |

*Primary Examiner*—Tu B. Hoang
*Attorney, Agent, or Firm*—Lackenbach Siegel, Marzullo Aronson & Greenspan, P.C.

[57] ABSTRACT

In a heater unit comprising a case 10 which accommodates therewithin an electrical heating element 11 and a temperature sensor 12 for detecting the temperature of the case 10 heated by the electrical heating element 11 to stop the power supply to the electrical heating element 11 when the temperature reaches a predetermined value, there is provided a heat conductive path 20 made of a material having a higher heat conductivity than that of the material making up the case 10 and extending from a region corresponding to the space in which the electrical heating element 11 or heater is placed to a region corresponding to the space in which the temperature sensor 12 or temperature detecting and power supply control member is placed. Thus, the heater unit for an aquarium fish tank is prevented from being extraordinarily heated when the tank has been destroyed.

4 Claims, 6 Drawing Sheets

HEATER FOR AQUARIUM FISH TANK

BACKGROUND OF THE INVENTION

1. Field of the Invention

The present invention relates generally to a heater for use in an aquarium fish tank, and more particularly to a heater fitted with a safety mechanism for preventing any extraordinary heating.

2. Description of the Related Art

In breeding aquarium fish in a tank, it is necessary to keep the temperature of the water in the tank within a specific temperature range. To this end, it is indispensable to the aquarium fish tank to have a heater for maintaining a desired water temperature. A well-known type of heater is one comprising a case to be disposed in water and constructed to accommodate therein an electrical heating element such as nichrome wire; the electrical heating element is energized by electrical power supply to heat the case.

A temperature sensor, such as a thermostat, is used to control power supply to the electrical heating element for keep the water temperature within a specific temperature range. The temperature sensor is accommodated in the interior of the heater.

The temperature sensor, in the form of a thermostat, is interposed in an electric circuit between the electrical heating element and a power source. The temperature sensor serves to detect the temperature of the case heated by the electrical heating element and to interrupt the power supply thereto when the heat reached a predetermined temperature.

A material used in making the case housing the electrical heating element in this type of heater is typically a ceramic or glass since it is required to be made of an anti-corrosion material due to long-term immersion in the water and to resist breakage arising from an abrupt temperature change.

Figure 12:
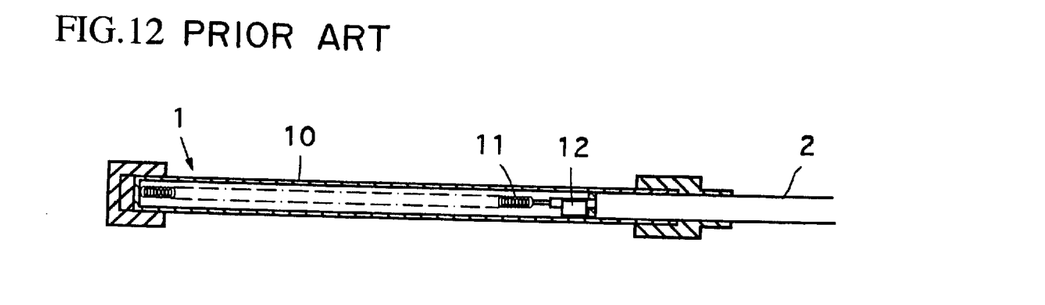
FIG. 12 is a partially cut-away side elevational view of a conventional heater.
Figure 13:
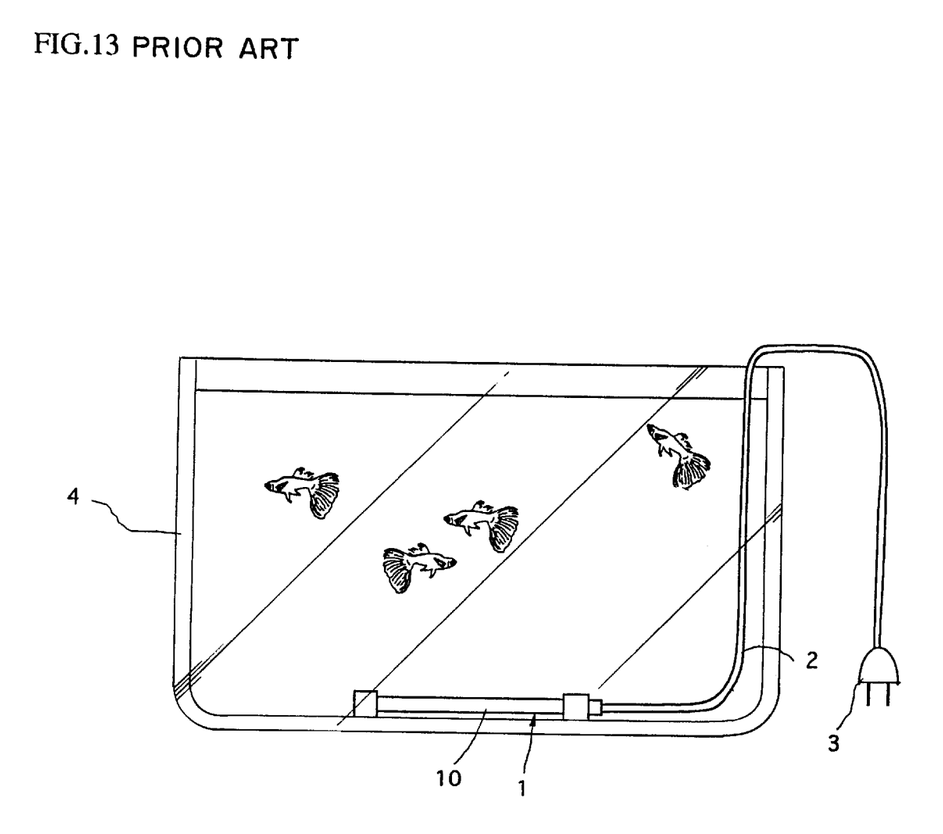
FIG. 13 is a side elevation view in cross section, illustrating the heater of FIG. 1 in a fish tank filled with water.

FIG. 12 illustrates, by way of example, a known heater of this type. The heater is generally designated by reference numeral 1 and comprises a case 10, an electrical heating element 11, and a temperature sensor 13 such as a thermostat.

FIG. 12 illustrates the known heater 1 connected to an electrical lead 2 which is coated with rubber and waterproofed and provided with an electrical plug 3 for connection to a power source socket externally of the tank. The heater 1 is disposed on the bottom of an aquarium tank 4 for heating the water therein.

In the conventional type of heater described above, heat originating from the portion on the surface of the case in which the electrical heating element is located is conducted through water inside the tank to a portion corresponding to the region in which the temperature sensor is located, and if the heat reaches a predetermined temperature, the power supply is interrupted. Accordingly, extraordinary heating of the heater above a predetermined value would be prevented in the normal condition.

Now, supposing that the tank has been turned over and destroyed due to an external shock, such as an earthquake, the heater may be thrown out of the tank into the room. In such an event, the tank has no water left and hence naturally the water temperature is not detected by the temperature sensor, which will permit electrical power supply to continue, resulting in an extraordinary heating of the heater unit.

With respect to the temperature sensor accommodated in the interior of the heater, apparently there seems to occur no such situation, since theoretically a high heat is conducted from the region in which the electrical heating element is located, without passing through the water, but finally through the case itself or the air within the case, into the region corresponding to the space in which the temperature sensor is located. It is, however, envisaged that when the heater is exposed to air or the atmosphere, the rise of the temperature in the region on the surface of the case opposed to which the electrical heating element is located would be extremely sharp as compared with the case where the heater is immersed in water. This is due to the fact that in the water any sharp rise of the temperature on the surface of the heater case is suppressed by the temperature of water in contact therewith, whereas there is no such suppression in air.

On the contrary, ceramics or glass making up the case, and air within the interior of the case are of extremely low heat conductivity, which allows heat to be transmitted very slowly. Hence, before the heat is transmitted to the region corresponding to the portion in which the temperature sensor is located, the temperature of the region on the surface of the case opposed to where the electrical heating element is located will exceed the ignition point of some materials.

Therefore, in such an instance, there exists a risk which may give rise to a fire if the heater, thrown out of a tank, for example, in an earthquake, comes into contact with combustibles.

SUMMARY OF THE INVENTION

It is therefore an object of the present invention to provide a heater capable of obviating the above problems involved in the prior art.

To this end, in a heater, according to the invention, comprising a tubular case, made for example of a ceramic material or glass and having rubber end caps, to be disposed in water and constructed to house an electric heating element and a thermostat or thermostatic switch, to sense temperature and interrupt power supply, there is provided on the case a heat conductive path made of a material having a higher heat conductivity than that of a material making up the tubular case, the heat conductive path extending from a region corresponding to the space in which the electrical heating element is located and to a region corresponding to the space in which the temperature sensor, which is a thermostat switch, is located.

Thus, since in the heater of the present invention there is provided a heat conductive path which is made of a material having a higher heat conductivity than that of a material making up the case and extends from a region corresponding to the space in which the electrical heating element is located and to a region corresponding to the space in which the temperature sensor is located, a high heat generated if extraordinarily heated would be conducted rapidly through this heat conductive path to the region corresponding to the space in which the temperature sensor, in the form of a thermostat switch is located. As a result, even though the heater lies in the air, the electrical heating element can be deenergized before the temperature in the region corresponding to the space in which the electrical heating element is located reaches a predetermined value, that is, an igniting temperature. If the case has two spaces in which heat is sensed, two thermostat switches are provided, each in a respective space, to interrupt current supply. The thermostat switches in the various embodiments disclosed make use of warping of a bimetal, such as two bimetal plates having different thermal expansion coefficients. They detect temperature and above a predetermined temperature open the circuit.

BRIEF DESCRIPTION OF THE DRAWINGS

For a fuller understanding of the present invention, reference is had to the following description taken in conjunction with the accompanying drawings, in which.

DESCRIPTION OF THE PREFERRED EMBODIMENTS

Exemplary embodiments of the present invention will now be described with reference to the accompanying drawings in which various embodiments of the heater of the invention have similar reference numerals for ease of understanding the different embodiments.

Figure 1:
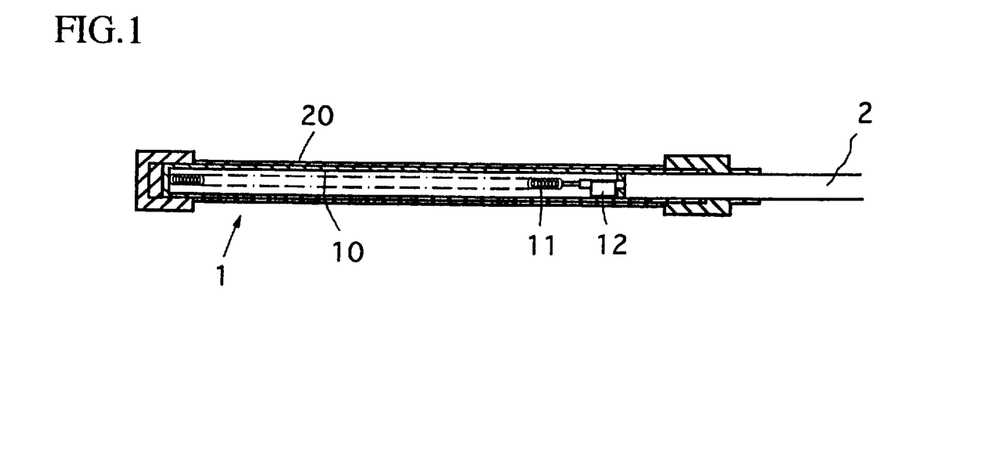
FIG. 1 is a partially cut-away side elevational view of a heater according to a first embodiment of the present invention.

Referring to FIG. 1 there is depicted a heater constructed in accordance with a first embodiment of the present invention. The heater generally designated by reference numeral 1 in the diagram comprises a tubular case 10 made of ceramics or glass and having an internally waterproof structure. Within the interior of the case 10 are accommodated an electrical heating element 11 such as nichrome wire for heating the case 10 and a temperature sensor 12. The temperature sensor 12 is a thermostat switch which intervenes on an electric circuit not shown between the electrical heating element 11 and a power source to detect the temperature of the case 10 heated by the electrical heating element 11. The sensor 12 serves to interrupt the power supply to the electrical heating element 11 when the temperature reaches a predetermined value.

A heat conductive path designated by reference numeral 20 in the diagram is provided on the case 10 and in this embodiment is formed from a cylinder of the metal (e.g., aluminum, iron, etc.) which is a material having a higher heat conductivity than that of the ceramics or glass making up the case 10. The heat conductive path 20 is fitted over the entire external periphery of the case 10. Thus, this heat conductive path 20, on the surface of the case 10, joins a region surrounding the electrical heating element 11 accommodated therewithin to a region surrounding the temperature sensor 12 accommodated therewithin.

Second Embodiment

Figure 2:
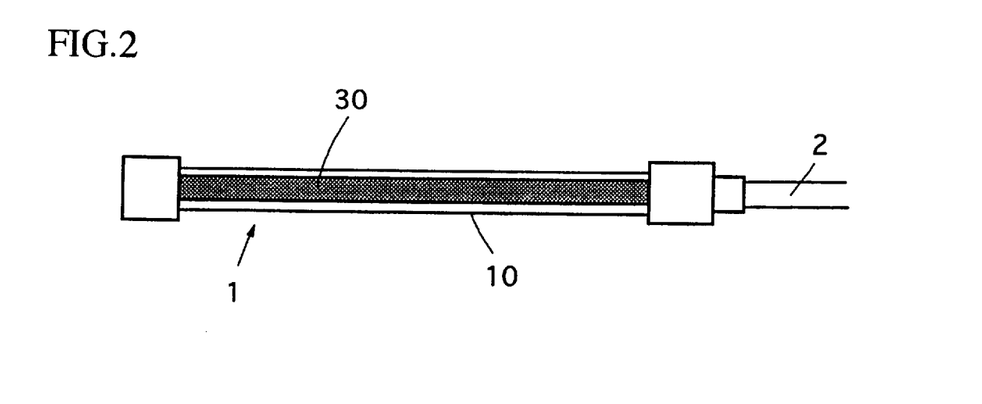
FIG. 2 is a side elevational view of a heater according to a second embodiment of the present invention.

Referring to FIG. 2 there is depicted a heater constructed in accordance with a second embodiment of the present invention. The heater also designated by reference numeral 1 in the diagram has substantially the same constitution as that of the first embodiment described above.

A heat conductive path designated by reference numeral 30 in the diagram is provided on the case 10 and in this embodiment is formed from a metallic strip. The heat conductive path 30 is superposed on the surface of the case 10 so as to join, on the surface of the case 10, a region opposed to the electrical heating element 11 housed therewithin to a region opposed to the temperature sensor 12 housed therewithin.

Third Embodiment

Figure 3:
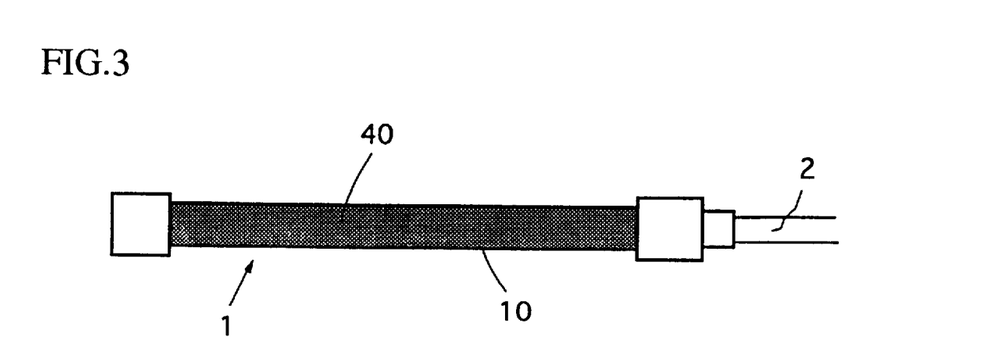
FIG. 3 is a side elevational view of a heater according to a third embodiment of the present invention.

Referring to FIG. 3 there is depicted a heater constructed in accordance with a third embodiment of the present invention. The heater also designated by reference numeral 1 in the diagram has substantially the same constitution as that of the first embodiment described hereinbefore.

A heat conductive path designated by reference numeral 40 is provided on the case 10 and in this embodiment is formed of a coating containing metallic powder over the entire surface of the case 10.

Fourth Embodiment

Figure 4:
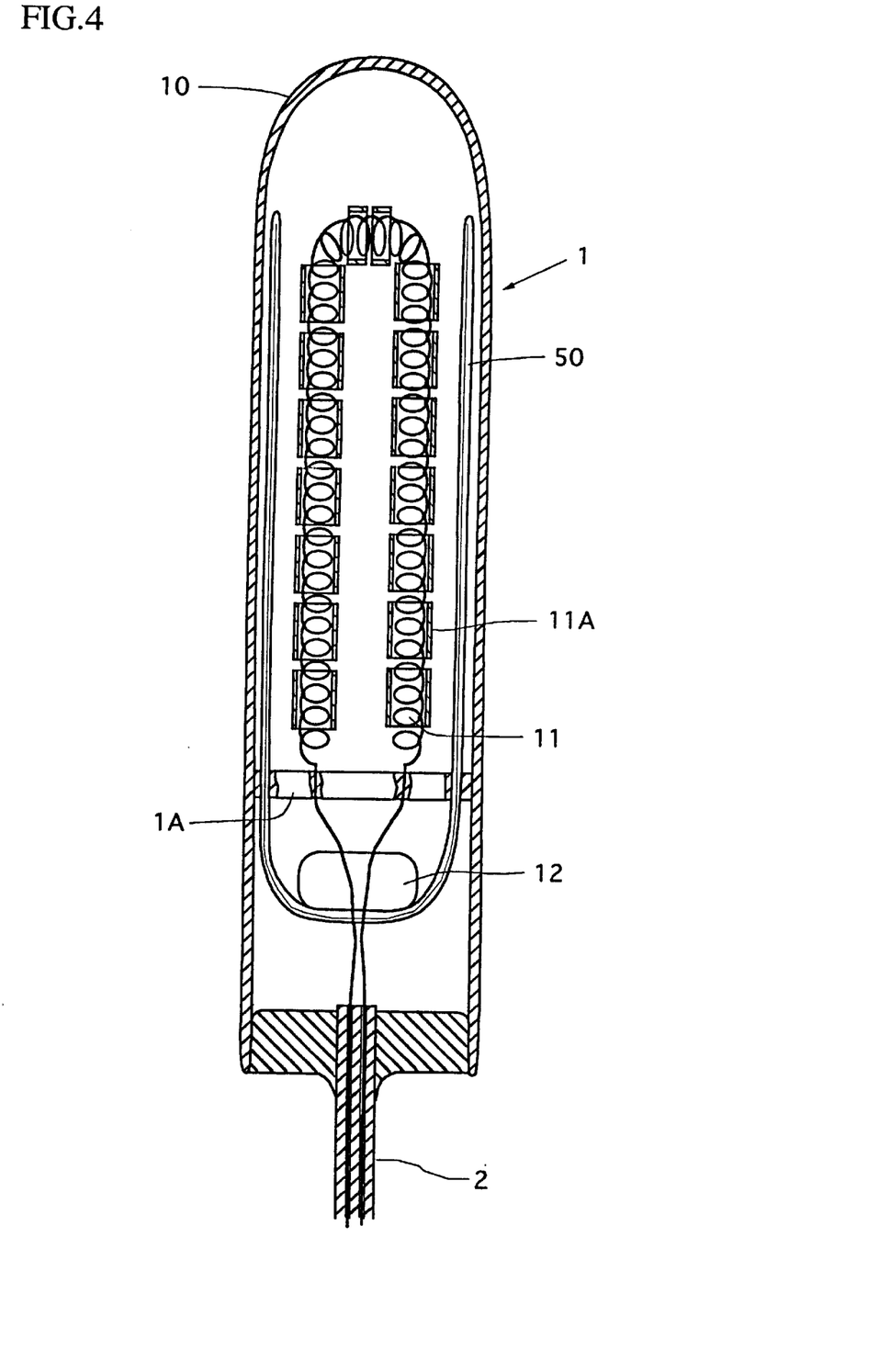
FIG. 4 is a partially cut-away side elevational view of a heater according to a fourth embodiment of the present invention.

Referring to FIG. 4 there is depicted a heater constructed in accordance with a fourth embodiment of the present invention. The heater generally designated by reference numeral 1 in the diagram comprises a cylindrical case 10 made of ceramics or glass and having an internally waterproof structure. Within the interior of the case 10 are accommodated an electrical heating element 11 such as a nichrome wire for heating the case 10 and a temperature sensor 12. The temperature sensor 12 intervenes on an electric circuit not shown between the electrical heating element 11 and a power source to detect the temperature of the case 10 heated by the electrical heating element 11. The sensor 12 serves to stop the power supply to the electrical heating element 11 when the temperature reaches a predetermined value. The electrical heating element 11 is sheathed with an insulating tube designated by reference numeral 11A in the diagram. A partition wall designated by reference numeral 1A in the diagram separates the electrical heating element 11 and the temperature sensor 12.

A heat conductive path designated by reference numeral 50 is accommodated within the case 10 and in this embodiment is formed from a bar member of a metal (e.g., aluminum, iron, etc.) which is a material having a higher heat conductivity than that of the ceramics or glass making up the case 10. A part of the heat conductive path 50 is in contact with the temperature sensor 12 and the remaining portion thereof extends over the region in opposition to which the electrical heating element 11 is placed. It is to be appreciated that the bar member constituting the heat conductive path 50 is bent into a U-shape, the bottom portion of the U-shape being brought into contact with the temperature sensor 12 and a pair of arm portions extending in such a manner as to sandwich the electrical heating element 11 therebetween.

Fifth Embodiment

Figure 5:
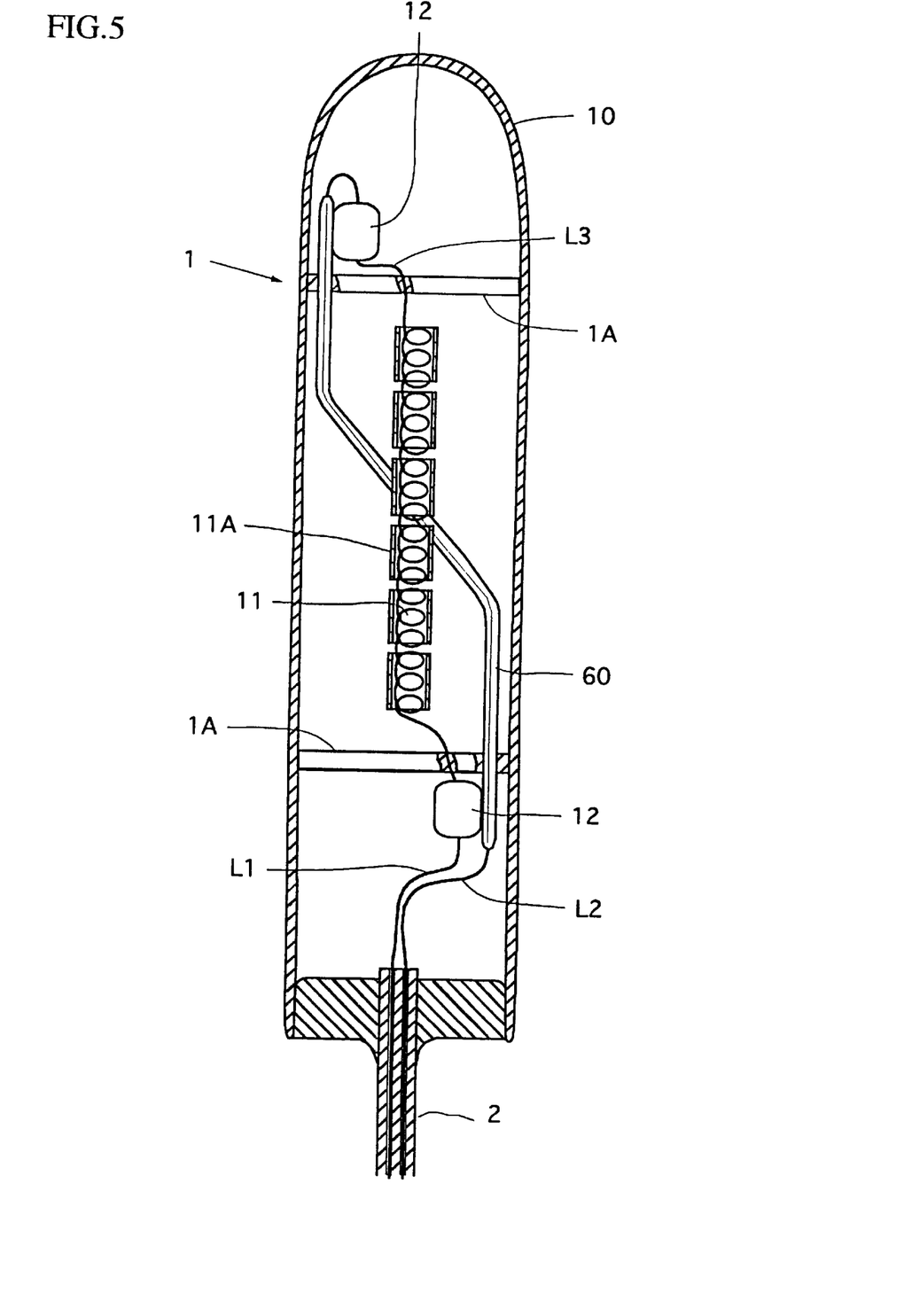
FIG. 5 is a partially cut-away side elevational view of a heater according to a fifth embodiment of the present invention.

Referring to FIG. 5 there is depicted a heater constructed in accordance with a fifth embodiment of the present invention. The heater generally designated by reference numeral 1 in the diagram comprises a cylindrical case 10 made of ceramics or glass and having an internally waterproof structure. Within the interior of the case 10 are accommodated an electrical heating element 11 such as a nichrome wire for heating the case 10 and a pair of temperature sensors 12. The pair of temperature sensors 12 intervene on an electric circuit not shown between the electrical heating element 11 and a power source to detect the temperature of the case 10 heated by the electrical heating element 11. The sensors 12 serve to stop the power supply to the electrical heating element 11 when the temperature reaches a predetermined value. In this embodiment the pair of sensors 12 are respectively arranged at opposite ends in the longitudinal direction within the case 10 so as to sandwich the electrical heating element 11. The electrical heating element 11 is sheathed with an insulating tube designated by reference numeral 11A in the diagram. A pair of partition walls each designated by reference numeral 1A in the diagram separate the electrical heating element 11 from the pair of temperature sensors 12.

A heat conductive path designated by reference numeral 60 is accommodated within the case 10 and in this embodiment is formed from a bar member of a metal (e.g., aluminum, iron, etc.) which is a material having a higher heat conductivity than that of the ceramics or glass making up the case 10. The heat conductive path 60 is partly in contact with the temperature sensors 12 and the remaining portion thereof extends over the region in opposition to which the electrical heating element 11 is placed. It is to be appreciated that the bar member constituting the heat conductive path 60 has terminals ends in contact with the pair of temperature sensors 12 and has an intermediate portion thereof diagonally extending over the region in opposition to the electrical heating element 11 is disposed.

Sixth Embodiment

Figure 6:
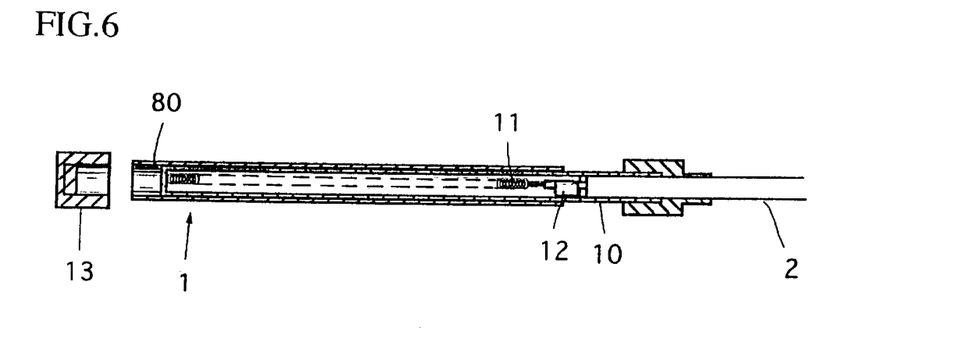
FIG. 6 is a partially cut-away side elevational view of a heater according to a sixth embodiment of the present invention.
Figure 7:
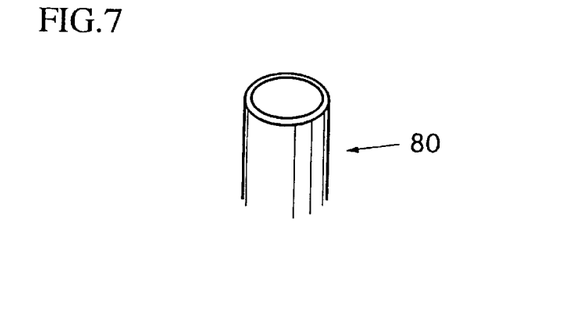
FIG. 7 is a perspective view of an adaptor constructed in accordance with the sixth embodiment of the present invention.

FIGS. 6 and 7 illustrate a sixth embodiment of a heater constructed in accordance with the present invention. This inventive heater may be implemented by mounting an existing heater with an adaptor.

Reference numeral 1 in the diagram denotes the existing heater to which the adaptor is to be attached. This heater 1 comprises a cylindrical case 10 made of ceramics or glass and having interior of a waterproof structure. An electric heating element 11 such as nichrome wire for heating the case 10 and a temperature sensor 12 are accommodated within the interior of the case 10. The temperature sensor 12 intervenes on an electric circuit not shown between the electrical heating element 11 and a power source to detect the temperature of the case 10 heated by the electrical heating element 11. The sensor 12 serves to stop the power supply to the electrical heating element 11 when the temperature reaches a predetermined value.

Reference numeral 80 in the diagram denotes the adaptor. This adaptor 80 is in the form of a cylinder having an internal periphery snugly matching the external periphery of the case 10 of the heater 1 and having a length covering the entire length of the case 10. In this embodiment the adaptor 80 is made of a metal (e.g., aluminum, iron, etc.) which is a material having a higher heat conductivity than that of the ceramics or glass making up the case 10.

Reference numeral 13 is an end cap fitted to the terminal end of the case 10. After the removal of this end cap 13, the case 10 is inserted into the adaptor 80 to complete the attachment of the adaptor 80.

Seventh Embodiment

Figure 8:
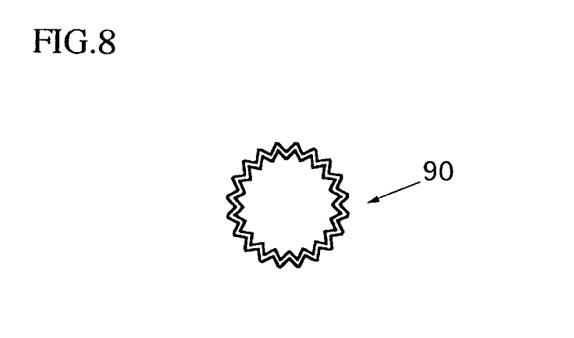
FIG. 8 is a top plan view of an adaptor constructed in accordance with a seventh embodiment of the present invention.

FIG. 8 illustrates a seventh embodiment of a heater constructed in accordance with the present invention. In this embodiment an adaptor 90 is comprised of a metallic cylinder having a gear-like section, the remainder of the structure being common to the sixth embodiment described above. According to this embodiment, the inner diameter of the adaptor 90 is variable due to its expansion and contraction, thereby making it possible to be applied to various cases 10 having different outer diameters depending on the type of the heater.

Eighth Embodiment

Figure 9:
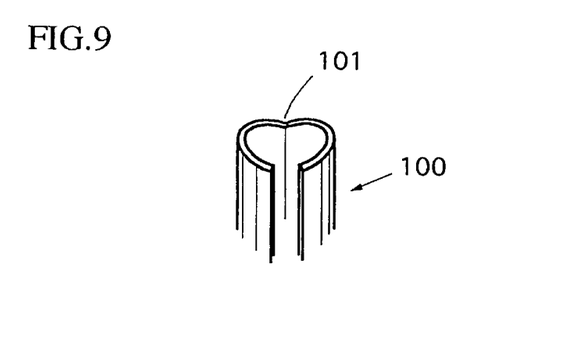
FIG. 9 is a perspective view of an adaptor constructed in accordance with an eighth embodiment of the present invention.

FIG. 9 illustrates an eighth embodiment of a heater constructed in accordance with the present invention. In this embodiment an adaptor 100 is comprised of a metallic cylinder longitudinally split into two sections which can be opened or closed by way of a hinge 101, the remainder of the structure being common to the sixth embodiment described thereinbefore. According to this embodiment, the adaptor 100 can be loaded on or unloaded from the case 10 of the heater 1 by opening and closing the cylinder, thus eliminating any necessity of attachment or detachment of the end cap.

Ninth Embodiment

Figure 10:
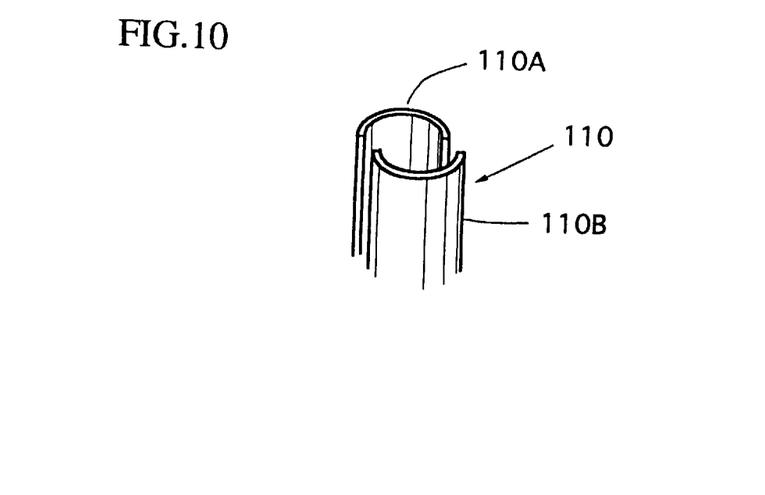
FIG. 10 is a perspective view of an adaptor constructed in accordance with a ninth embodiment of the present invention.

FIG. 10 illustrates a ninth embodiment of a heater constructed in accordance with the present invention. In this embodiment an adaptor 110 is comprised of a metallic cylinder longitudinally split into two sections 110A and 110B which can be joined together by a joint mechanism not shown in particular, the remainder of the structure being common to the sixth embodiment described hereinbefore.

Tenth Embodiment

Figure 11:
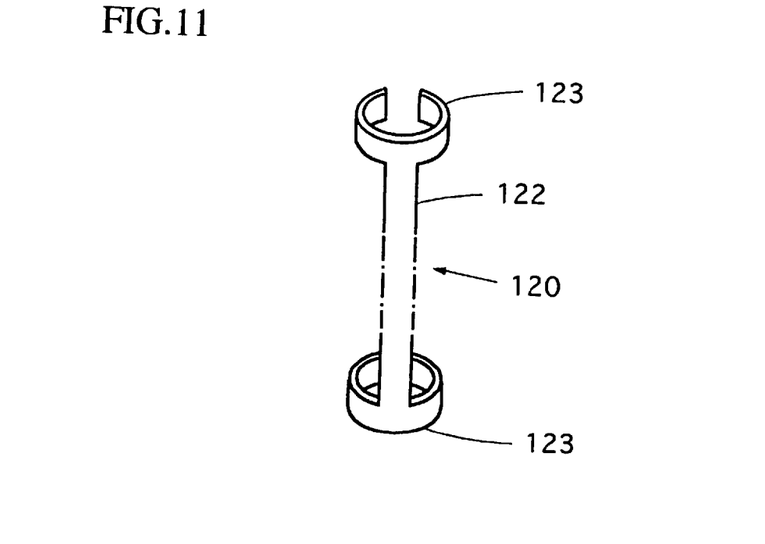
FIG. 11 is a fragmentary perspective view of an adaptor constructed in accordance with a tenth embodiment of the present invention.

FIG. 11 illustrates a tenth embodiment of a heater constructed in accordance with the present invention. In this embodiment an adaptor 120 is comprised of a strip 122 joining between a pair of clips 123 for gripping the case 10 of the heater, the entire adaptor being made of a metal, and the remainder of the structure being common to the sixth embodiment.

It will thus been seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A heater for an aquarium fish tank, comprising:
   a case, having an outer surface, and having an internally waterproof structure so as to be disposed in water inside said aquarium fish tank;
   an electrical heating element accommodated within said case to heat said case;
   a temperature sensor intervening on an electric circuit between said electrical heating element and a power source, said temperature sensor serving to detect the temperature of said case heated by said electrical heating element so as to stop the power supply to said electrical heating element when a predetermined temperature value is reached; and
   a heat conductive path provided on and in contact with the outer surface of said case and made of a material having a higher heat conductivity than that of a material making up said case to thereby conduct the temperature at a specific region on the surface of said case to another specific region on the surface of said case, said heat conductive path extending on the surface of said case between a region in opposition to which said electrical heating element is located and a region in opposition to which said temperature sensor is located.

2. A heater for an aquarium fish tank according to claim 1, wherein said case is made of ceramics or glass, and said heat conductive path is formed from a metallic cylinder, said cylinder being fitted over the external periphery of said case.

3. A heater for an aquarium fish tank according to claim 1, wherein said case is made of ceramics or glass, and said heat conductive path is formed from a metallic strip, said strip being superposed on the external periphery of said case.

4. A heater for an aquarium fish tank according to claim 1, wherein said case is made of ceramics or glass, and said heat conductive path is formed of a coating containing metallic powder over said case.

* * * * *